April 8, 1958
G. J. KNUDSON
2,829,507
COUPLING
Filed Sept. 30, 1955
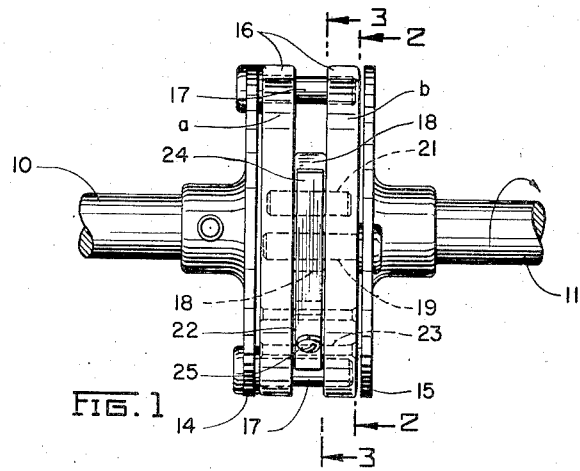
FIG. 1
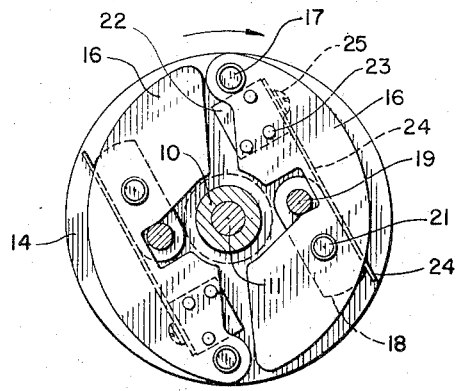
FIG. 2
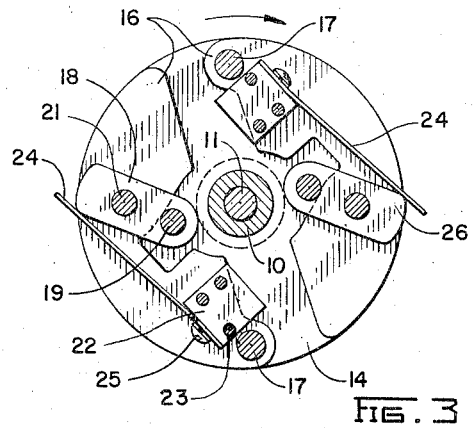
FIG. 3
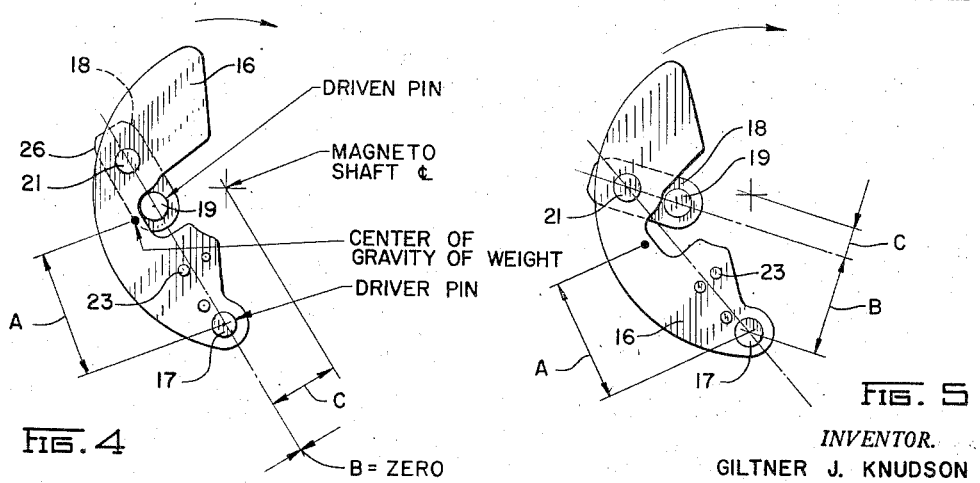
FIG. 4
FIG. 5
INVENTOR.
GILTNER J. KNUDSON
BY
Bauer and Seymour
ATTORNEYS

United States Patent Office 2,829,507
Patented Apr. 8, 1958

2,829,507

COUPLING

Giltner J. Knudson, Guilford, N. Y., assignor to Bendix Aviation Corporation, Sidney, N. Y., a corporation of Delaware Application September 30, 1955, Serial No. 537,678

12 Claims. (Cl. 64—25)

This invention relates to mechanical couplings and more particularly to apparatus for drivably connecting rotating parts while permitting and automatically controlling the limited relative angular movement thereof in response to changes in rotational speed.

Among the many uses of this invention is its application to ignition systems of internal combustion engines or the like for varying the timing of the ignition sparks. The invention will be particularly described in connection with a mechanism suited to such use, but it is to be understood that this particular description is for the purpose of illustration only and does not constitute a limitation upon the natural scope of the invention.

One of the objects of the present invention is to provide novel means for mechanically coupling rotating parts, which means are adapted to effect relative angular movement of the parts in response to and in accordance with variations in the speed of rotation of said parts.

Another object of the invention is to provide novel centrifugally responsive apparatus of the above character which will inherently compensate in a desirable and novel manner for the variations in centrifugal forces which accompany changes in rotational speed.

Still another object is to provide novel coupling means of the centrifugally responsive type wherein less space and less relative movement of the parts are required than are necessary in similar couplings heretofore known for attaining comparable results.

A further object of the invention is to provide a novelly constructed coupling device wherein friction is substantially eliminated so that the action of the coupling in relation to the rotational speed follows substantially the same curve during both speed increases and corresponding decreases in speed.

Another object is to provide a novel centrifugally responsive coupling device which is so constructed that the conventional resilient means heretofore universally used for opposing the movements of the centrifugal weights in response to centrifugal force may be dispensed with.

Still another object of the invention is to provide a coupling of the type which is actuated by centrifugal force to effect relative angular movements of driving and driven parts, said coupling being novelly so constructed that the curve of relative angular movement in relation to rotational speed may be varied in a novel manner.

A still further object is to provide a speed sensitive coupling between rotating parts whereby a substantially straight line variation of relative movement between the rotating parts in response to variations in speed may be obtained throughout a relatively wide speed range.

The above and further objects and novel features of the invention will more fully appear from the following detail description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, Fig. 1 is a side elevation view illustrating one form of device exemplifying the invention, said view being taken from the left of Fig. 2;

Fig. 2 is a transverse sectional view taken substantially on line 2—2 of Fig. 1, showing the centrifugal weights in positions assumed thereby at low or zero speed;

Fig. 3 is a transverse sectional view taken substantially on line 3—3 of Fig. 1 and showing the centrifugal weights in the positions assumed thereby at high rotational speeds; and, Figs. 4 and 5 are diagrammatic views illustrating the flyweight in different positions with respect to the axis of rotation.

In the operation of internal combustion engines, such as automotive engines, it has been found that both efficiency and power output are enhanced at different speeds if the ignition sparks are properly timed in relation to the engine pistons. It is known, too, that proper timing of the ignition sparks varies with the engine speed and hence, that it is desirable to vary the timing desirably as the speed increases or decreases. It is desirable in many instances to advance the sparks gradually with and proportionally to speed increases throughout a wide range of speeds and to correspondingly retard the sparks as the engine speed is reduced. The present invention attains this desirable end with a novelly constructed centrifugally responsive device for coupling an engine driven part to a suitable driven part of an ignition device. Although the invention will be described primarily as a coupling between an engine and a magneto, it will be understood that the same may be advantageously used in many other environments.

In the drawing wherein a single embodiment of the invention is illustrated, by way of example, a driving part or shaft 10 is shown connected for limited relative angular movement to a driven shaft 11 by one form of the novel coupling comprehended. In an ignition system, the driven shaft may be connected to a magneto rotor, timer, distributor or the like. In the interest of increased rigidity, the end of shaft 11 may be reduced and journalled in the recessed end of shaft 10. Shafts 10 and 11 have flanges or discs 14 and 15 secured thereto or formed integrally therewith for supporting the coupling device to be next described.

The novel means comprehended for drivably coupling the parts 10, 14 and 11, 15 may consist of one or a plurality of centrifugally actuated weights, a plurality being desired for purposes of symmetry and balance. As shown, two diametrically opposed flyweights 16, 16 are employed. Inasmuch as the two weights are identical and function identically in unison, only one will be described in detail and the same numerals are used to indicate identical parts of the two diametrically disposed centrifugal weight systems. Each weight 16 is kidney-shaped and is pivotally supported on a pin or stud 17 which is secured to and projects axially from the rim portion of flange 14.

The free end of weight 16 is operatively connected to the driven shaft or parts 11, 15 in a novel manner to provide a new and different inherent mode of operation whereby a more desirable relationship between rotational speed and the movement of the flyweights to produce spark advance, for example, is automatically maintained at all speeds throughout the speed range. For this purpose, the weights 16 are operatively connected to the driven member 15 by means of a short link 18. The latter is pivotally mounted on a pin or stud 19 which is secured to or formed integrally with member 15 and projects axially therefrom in parallel relation to pivot pins 17. Pins or pivots 19 are set in closer to the axis of rotation of shafts 10 and 11 than are pins 17 and in the illustrated embodiment, are spaced a little less than 90 degrees from the latter. Link 18 is also pivotally connected to centrifugal weight 16 by means of a pivot pin 21 in such a manner that pivot 19 lies between weight pivot 17 and connection pivot 21. In the form shown, each weight 16 is conveniently constructed from two parts *a* and *b* secured together in spaced relation with an interposed block 22 by a plurality of rivets 23, three being shown. Link 18 is accommodated in the space between parts *a* and *b*. Each of the latter and link 18, although shown as solid pieces in the interest of clarity, are preferably laminated to reduce production costs and to permit greater manufacturing tolerances.

Although it is not essential with the novel construction contemplated by this invention, resilient means may be provided for resisting movement of weights 16 in response to centrifugal forces and hence, for varying the curve of spark advance in relation to engine speed. In the illustrated embodiment, a leaf spring 24 is novelly incorporated into the centrifugally actuated system above described. The spring is secured at one end, such as by means of a screw 25, to block 22, which is an effective part of the centrifugal weight. The free end of the spring engages an end portion of link 18 which extends beyond connecting pivot 21. When the weight 16 swings outwardly from the axis of rotation of shafts 10, 11 in response to centrifugal force, the link is caused to pivot about pins 19 and 21 so that the rounded corner 26 of the link functions as a cam to flex spring 24 and hence, resist the outward movement of the weight system.

In most devices of this character which have been heretofore commercially used, the construction has been such that the centrifugal weights flutter at low speeds, particularly when the resisting torque is variable, such as the resisting torque of a magneto rotor at low speeds. The fluttering, i. e., the in and out movement of the flyweights, results from relative angular movement of the driving and driven parts or shafts which in a magneto results in turn from the variable action of the magnet as the magnetic poles thereof pass the stator pole shoes. To prevent this undesirable fluttering of the centrifugal weights, the parts of the present device are so constructed that the pivots 17, 19 and 21 are in a straight line when weight 16 is in its innermost position, i. e., when the device is stopped or when the same is operating at a slow speed which is insufficient to create enough centrifugal force to move the centrifugal weights. The construction is intended to rotate in a clockwise direction, as viewed in Figs. 2 and 3, so that the torque is transmitted from driving member 14 through pivot 17, centrifugal weight 16, pivot 21, link 18, and pivot pin 19 to driven member 15. Thus, the driving force holds weight 16 in its innermost position (Fig. 2) against the efforts of centrifugal forces until a predetermined rotational speed has been attained. Accordingly, it is not essential to provide springs 24 or other resilient means for this latter purpose. The inward movement of weights 16 in response to the driving force may be limited by any stop means. For example, the weight itself may engage pin 19, the free end of one weight 16 may engage the pivoted end of the other weight, or any other suitable stop means may be provided, such as on discs 14 and 15.

It will be seen, then, that until the centrifugal force acting to swing weights 16 outwardly reaches a predetermined value, i. e., until a predetermined speed of rotation is attained, the driving force as well as the resisting torque acts in a straight line through pivots 17, 19 and 21 so that any resultant force or torque in either direction will be unable to swing weight 16 outwardly. As long as said pivots are in a straight line, the centrifugal weight system is effectively locked against action in response to any mechanical force emanating from the rotating shafts, but the weights 16 are at all times free to swing outwardly in response to centrifugal force when the latter reaches a predetermined value. The extent of the outward swing of the weights will depend upon the value of the centrifugal force acting thereon at any time.

The outward swinging of weights 16 in relation to the rotational speed and, hence, the relationship of the relative movement of the driving part 14 and driven part 15 in relation to rotational speed, i. e., the spark advance curve, may be varied by varying the distance between pivots 19 and 21 and, hence, the effective length of link 18. In some instances, it may be desirable to provide resilient means for further varying the spark advance curve. The resilient means 24 contemplated by the present invention for this purpose is, as pointed out above, mounted on the centrifugal weight and is flexed by the camming action of link 18. When the centrifugally actuated parts are in their innermost position, spring 24 may engage a flat side of link 18 (Fig. 2), either with or without initial tension.

In a device such as a magneto, the average torque required to turn the rotor during normal operation does not vary appreciably with speed, but the centrifugal force acting upon weight 16 to swing it outwardly varies as the square of the rotational speed. At slow speeds the centrifugal force acting to move weight 16 is very small in comparison to the resisting torque of the magneto rotor or other driven part, whereas, at high speeds the reverse is true, i. e., the centrifugal force becomes greater than the resisting torque. The novel construction of the present invention makes it possible to compensate to almost any desired degree for this variation of centrifugal force by effecting a variation of the leverages or mechanical advantages of the operating forces as the weight 16 moves from one position to another. The non-linear increase of the centrifugal force in relationship to changes in speed is first of all partially compensated by the movement of weight 16 itself. The centrifugal force of the weight acts along a line containing the axis of rotation and the center of gravity of the weight and hence, through the leverage arm A (Fig. 4) about pivot 17. As the weight pivots outwardly, the leverage arm A (Fig. 5) is decreased slightly, thus reducing the effectiveness of the centrifugal force in actuating the weight.

The major compensations for variation of the centrifugal force are obtained from the novel arrangement of the linkage comprising weight 16 and link 18. When the elements are novelly connected in the manner herein described, the tension in link 18 is the force which, acting with a leverage arm B about pivot 17, restrains the outward movement of the flyweight in response to centrifugal force. When the device is stopped or operating at idling speed, i. e., when the pivots 17, 19, and 21 are in line, the arm B is zero (Fig. 4). However, as the weight 16 moves outwardly with increased speed, the leverage arm B increases and causes increased restraint to the outward movement of the weight 16. This compensation is further enhanced by the fact that, as will next appear, the tension in link 18 must increase as the speed increases. The tension in link 18 is the force which develops the torque to turn the driven member 15 which in a magneto is connected to a rotor. The leverage arm through which the link tension force acts in this regard is the perpendicular distance between the axis of rotation and the line of action of the force, i. e., the line connecting pivots 19 and 21. This leverage arm, designated C, is greatest at zero speed (Fig. 4) and decreases to a minimum when the flywheel 16 has swung to its outermost position (Fig. 5) and the centrifugal force is greatest. Thus, as the centrifugal force increases, thereby increasing the link tension, compensation for such increase is effected by automatically decreasing the length of leverage arm C. Accordingly, by suitably varying the length of link 18, the spark advance, i. e., the relationship of speed to the amount of relative movement between members 14 and 15, may be made substantially linear. In any given device, the spark advance curve may be varied or adjusted by varying the characteristics of spring 24. The latter is primarily an adjusting force which is of minor proportions in relation to the other forces acting on the parts of the device. The initial force of spring 24, if any, increases the shaft speed at which the weights 16 will begin to swing outwardly. If it is desired that movement of the weights begin at a slower shaft speed, an initial clearance may be provided between the spring and link 18, the spring may be omitted, or the magnitude of the weight may be increased. Spring 24 also has the effect of flattening the curve of weight movement plotted against shaft speed. This curve may also be varied by varying the effective length of link 18. When the link is made longer, the curve becomes steeper and the shaft speed range becomes greater for full movement of the weights.

Although only a single embodiment of the invention has been herein described and illustrated in the accompanying drawings, it is to be expressly understood that the invention is not limited thereto. For example, spring 24 may consist of a plurality of leaf springs, each of which may become effective at different positions in the swinging movement of weights 16 and links 18 about pivots 17 and 19, respectively. Shims may be inserted between spring 24 and block 22 to adjust or vary the action of any given spring. If desired, a suitable projection could be provided on weight 16 to engage an edge of link 18 to thereby limit either the outward or inward movement of the weight about pivot 17. Various other changes may also be made in the detail design and arrangement of the parts illustrated without departing from the spirit and scope of the invention as the same will now be understood by those skilled in the art.

What is claimed is:

1. A coupling for drivably connecting a rotatable driving member to a rotatable driven member comprising centrifugally responsive weight means pivotally connected to one of said members, a link pivotally connected to said weight means, and means pivotally connecting said link to the other of said members, the pivotal axis of said last-named connecting means being disposed between the pivotal axes of said first- and second-named pivotal connections, each of said pivotal axes being eccentric to the axis of rotation of said members.

2. A coupling as defined in claim 1 wherein said three pivotal axes are in substantially the same plane when said weight means is in its innermost position closest to the axis of rotation.

3. A coupling as defined in claim 1 wherein the means for pivotally connecting the link to said other of said members constitutes stop means for limiting the pivotal movement of said weight means inwardly toward said axis of rotation.

4. A coupling as defined in claim 1 comprising resilient means for yieldably resisting pivotal movement of said weight means in response to centrifugal force, said resilient means being mounted to apply forces directly to said weight means and said link.

5. A coupling as defined in claim 4 wherein said resilient means is mounted on said weight means for movement therewith, and comprising means responsive to movement of said weight means for exerting a biasing force on said resilient means, said force being directed outwardly from the axis of rotation of said members.

6. A coupling as defined in claim 4 wherein said resilient means includes a leaf spring.

7. A coupling as defined in claim 1 comprising a leaf spring mounted on said weight means and engageable with said link, the latter being shaped to constitute cam means for flexing said spring when said weight means is pivoted outwardly in response to centrifugal force.

8. A coupling as defined in claim 1 comprising resilient means mounted on said weight means for movement therewith and to yieldably resist pivotal movement of said weight means in response to centrifugal force, and cam means movable in response to pivotal movement of said weight means for increasing the bias of said resilient means when said weight means is pivoted outwardly in response to centrifugal force.

9. A coupling as defined in claim 8 wherein said cam means is carried by said link at the end thereof adjacent its pivotal connection to said weight means.

10. Apparatus of the class described comprising rotary driving means, rotary driven means, and means for drivably coupling said driving and driven means while permitting limited relative movement thereof, said coupling means comprising weight means, means for pivotally connecting said weight means to said driving means for pivotal movement in response to centrifugal force, a link, means for pivotally connecting one end of said link to said weight means, means for pivotally connecting the other end of said link to said driven means, the pivotal axis of said last-named connecting means being eccentric to the axis of rotation of said driving and driven means and disposed between the axes of said first- and second-named pivotal connections, whereby the driving force of the driving means tends to hold said weight means in its innermost position closest to said axis of rotation and whereby outward pivotal movement of said weight means about said first-named pivotal connection imparts angular movement to said driven means relative to said driving means.

11. Apparatus as defined in claim 10 comprising resilient means including a leaf spring secured to said weight means adjacent said first-named connecting means, the free end of said spring being adapted to engage said one end of said link.

12. Apparatus as defined in claim 11 wherein said link constitutes cam means for flexing said spring relative to said weight means during outward pivotal movement of said weight means in response to centrifugal force.

References Cited in the file of this patent

UNITED STATES PATENTS

| 1,363,745 | Moore | Dec. 28, 1920 |
| 1,590,772 | Moore | June 29, 1926 |
| 2,387,195 | Tjaarda et al. | Oct. 16, 1945 |